United States Patent
Kamiyama et al.

[11] Patent Number: 6,056,017
[45] Date of Patent: May 2, 2000

[54] PIPE LINING METHOD

[75] Inventors: Takao Kamiyama, Kanagawa-ken; Yasuhiro Yokoshima; Shigeru Endoh, both of Ibaraki-ken; Hiroyuki Aoki, Saitama-ken, all of Japan

[73] Assignees: Shonan Gosei-Jushi Seisakusho K.K., Hiratsuka; Yokoshima & Company, Ibaraki-ken; GET Inc., Tsukuba; OAR Company, Tokorozawa, all of Japan

[21] Appl. No.: 09/238,275

[22] Filed: Jan. 27, 1999

[30] Foreign Application Priority Data

Jan. 27, 1998 [JP] Japan ................. 10-014038

[51] Int. Cl.[7] ................. F16L 55/16
[52] U.S. Cl. ................. 138/98; 138/97; 405/150.1; 156/287; 264/269
[58] Field of Search ................. 138/98, 97; 405/150.1; 156/287; 264/267, 269

[56] References Cited

U.S. PATENT DOCUMENTS

| | | | |
|---|---|---|---|
| 5,329,063 | 7/1994 | Endoh | 138/98 |
| 5,439,033 | 8/1995 | Kamiyama et al. | 138/98 |
| 5,454,401 | 10/1995 | Kamiyama et al. | 138/98 |
| 5,566,719 | 10/1996 | Kamiyama et al. | 138/98 |
| 5,598,873 | 2/1997 | Kamiyama et al. | 138/98 |
| 5,692,543 | 12/1997 | Wood | 138/98 |
| 5,778,937 | 7/1998 | Sundermann | 138/98 X |

OTHER PUBLICATIONS

UK Patent Application 2041147 Bridgestock, Sep. 1980.

*Primary Examiner*—Patrick Brinson
*Attorney, Agent, or Firm*—Knobbe, Martens, Olson & Bear, LLP

[57] ABSTRACT

A pipe lining method provides for precise cutting of a main pipe liner bag along a branch pipe opening using a cutter while preventing the inner wall of a branch pipe and the cutter from damages. After a cutting protection member is attached along the periphery of a branch pipe opening of a main pipe, the main pipe is lined using a main pipe liner bag. Then, a cutter of a cutting robot introduced into the main pipe is driven to cut away a portion of the main pipe liner bag covering a branch pipe opening. Since the cutting protection member functions as a guide for the cutter when cutting the portion of the main pipe liner bag covering the branch pipe opening as well as functions as a protection member for protecting the inner wall of the branch pipe, thereby making it possible to precisely cut the main pipe liner bag along the branch pipe opening using the cutter and to prevent the inner wall of the branch pipe and the cutter from damages.

12 Claims, 7 Drawing Sheets

PIPE LINING METHOD

BACKGROUND OF THE INVENTION

1. Field of the Invention

This invention relates generally to branch pipe lining techniques, and more particularly, to a pipe lining method which is implemented using a main pipe liner bag.

2. Description of the Related Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. The pipe lining method utilizes a tubular pipe liner bag made of a resin-absorbent material impregnated with a hardenable resin, and having the outer surface covered with a highly air-tight plastic film. The tubular pipe liner bag is inserted into a pipe to be repaired by means of a pressurized fluid such that the pipe liner bag is turned inside out as it proceeds deeper in the pipe. Hereinafter, this manner of insertion shall be called "everting." When the entire length of the tubular liner bag is everted (i.e., turned inside out) into the pipe, the everted tubular liner is pressed against the inner wall of the pipe by a pressurized fluid, and the tubular flexible liner is hardened as the hardenable resin impregnated in the liner is heated, which is effected by heating the fluid filling the tubular liner bag. It is thus possible to line the inner wall of the defective or old pipe with a rigid liner without digging the ground and disassembling the pipe sections.

The foregoing pipe lining method can be similarly applied to the lining of a main pipe of sewerage pipes or the like and a branch pipe branched off the main pipe.

When a main pipe is lined using a main pipe liner bag by the pipe lining method as mentioned above, an opening of a branch pipe toward the main pipe (branch pipe opening) is covered with the main pipe liner bag, so that a portion of the main pipe liner bag covering the opening must be cut away. Conventionally, this cutting operation has been performed by means of a cutting robot which is remotely controlled on the ground to drive a cutter mounted thereon.

However, the cutting operation through the remote control of the cutting robot for cutting a main pipe liner bag along an opening of a branch pipe requires much experience. It is generally difficult to precisely cut a main pipe liner bag along an opening of a branch pipe with a cutter through remote control, and therefore, an inner wall of the branch pipe, more specifically a periphery of the branch pipe opening toward the main pipe, is likely to be damaged by the cutter, and the cutter itself, as the case may be, may also be significantly broken.

Object of the Invention

It is, therefore, a principal object of this invention to provide an improved pipe lining method.

It is a further object of this invention to provide a pipe lining method which is capable of precisely cutting a main pipe liner bag used for lining of a main pipe along an opening of a branch pipe.

It is still further object of this invention to provide a pipe lining method which is capable of preventing the inner wall periphery of the branch pipe opening and a cutter from being damaged.

SUMMARY OF THE INVENTION

To achieve the above objects, the present invention provides a pipe lining method comprising the steps of attaching a protection member along a periphery of a branch pipe opening of a main pipe; lining the main pipe using a main pipe liner bag, wherein the main pipe liner bag comprises a tubular resin-absorbent material and an unhardened liquid hardenable resin impregnated into the tubular resin-absorbent material; and removing a portion of the main pipe liner bag covering the branch pipe opening.

Thus, according to the present invention, the protection member is attached along the periphery of a branch pipe opening of a main pipe before the main pipe is lined using a main pipe liner bag, and subsequently the main pipe is lined using the main pipe liner bag, so that the protection member functions as a guide for the cutter when removing a portion of the main pipe liner bag covering the branch pipe opening as well as functions as a protection member for protecting the periphery of the branch pipe opening, thereby making it possible to precisely cut the main pipe liner bag along the branch pipe opening and to prevent the periphery of the branch pipe opening from damages.

Another feature of the invention is adapted to be embodied in the method where the protection member may be made of metal, and the remover such as a cutter may include at least a wire brush.

In accordance with this feature of this invention, the wire brush can remove the main pipe liner bag made of a hardened resin but cannot remove the protection member made of a metal, whereby the periphery wall of the branch pipe opening and the cutter are more reliably protected by the protection member from damages.

A further feature of this invention provides a pipe lining method comprising the steps of lining said main pipe using a main pipe liner bag, wherein said main pipe liner bag comprises a tubular resin-absorbent material and an unhardened liquid hardenable resin impregnated into said tubular resin-absorbent material; cutting a portion of said main pipe liner bag covering a branch pipe opening toward said main pipe with the cutter; and monitoring said cutting within said branch pipe.

In accordance with this further feature of the invention, since the situation within a branch pipe is monitored on the ground, it is possible to prevent the occurrence of inconvenience such as the wire brush of the cutter being excessively pressed onto the protection member to be bent.

The above and other objects, features, and advantages of the present invention will become apparent from the following detailed description of the preferred embodiments thereof when read in conjunction with the accompanying drawings.

DETAILED DESCRIPTION OF THE PREFERRED EMBODIMENT

The present invention will hereinafter be described in connection with preferred embodiments thereof with reference to the accompanying drawings.

Figure 1:
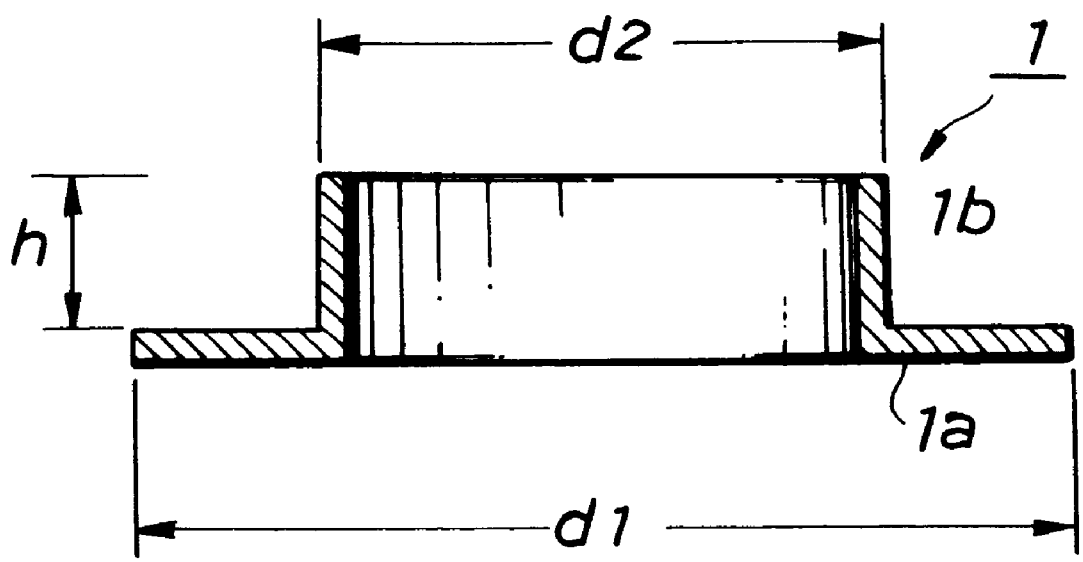
FIG. 1 is a cross-sectional view illustrating a cutting protection member.

FIG. 1 is a cross-sectional view illustrating a cutting protection member 1 for use in a pipe lining method according to an embodiment of the present invention. Specifically, the cutting protection member 1 is made of a metal such as stainless steel (SUS) or the like, and is composed of a flange portion 1a and a cylindrical protector portion 1b integrally formed with the inner periphery of the flange portion 1a.

The flange portion 1a of the cutting protection member 1 has an outer diameter d1 larger than an inner diameter d of a branch pipe 11 (see FIG. 2), later described (d1>d), and is molded into an arcuate shape conformal to the inner wall of a main pipe 10 (see FIG. 2), later described. The protector portion 1b formed integrally with the inner periphery of the flange 1a has an outer diameter d2 set slightly smaller than the inner diameter d of the branch pipe 11, and a height set in a range of 10 m/m to 50 m/m.

Next, the pipe lining method according to an embodiment of the present invention will be described with reference to FIGS. 2 through 6. FIGS. 2 through 6 are cross-sectional views illustrating in order various steps of the pipe lining method according to an embodiment of the present invention.

Figure 2:
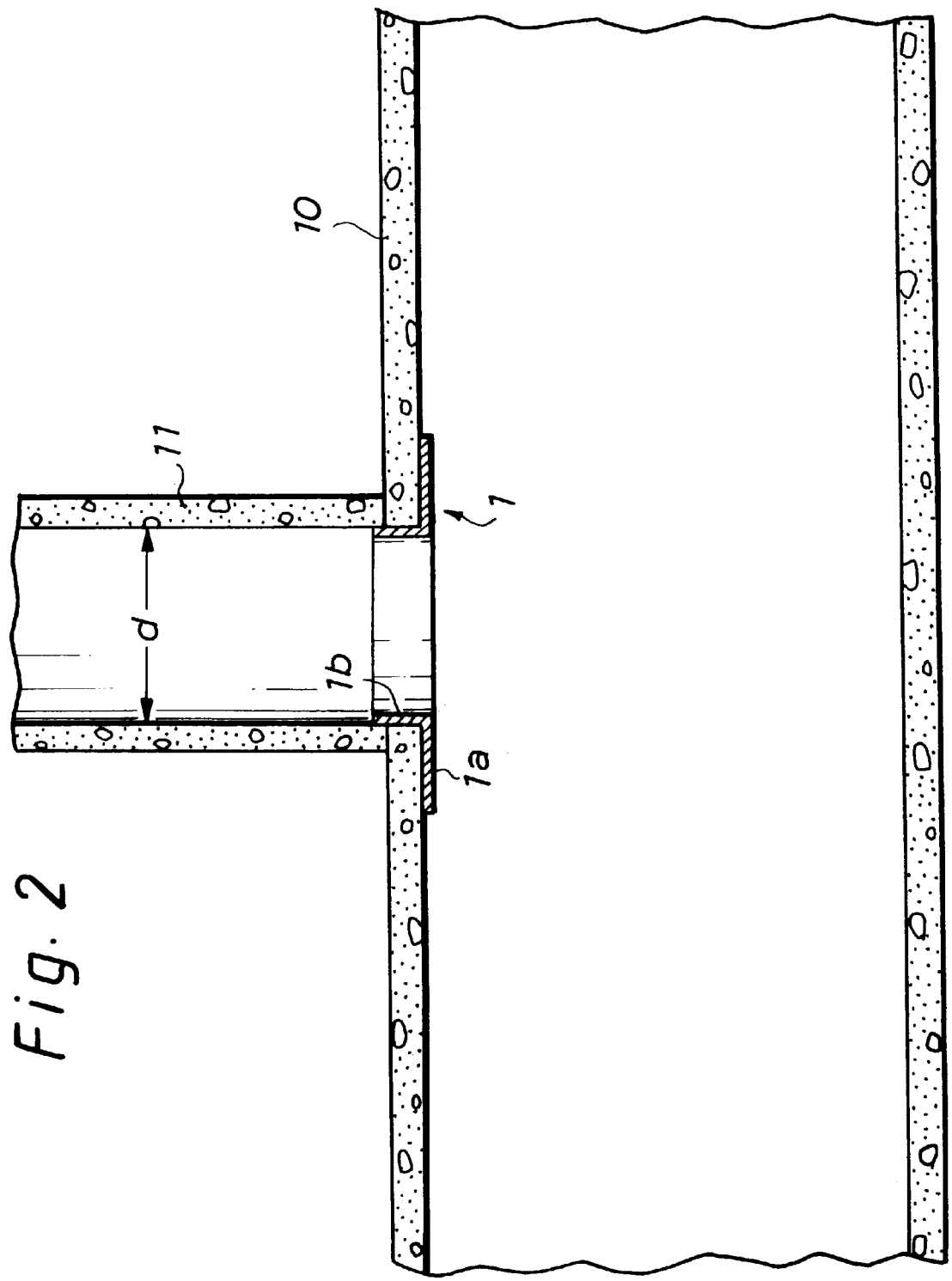
FIGS. 2 through 6 are cross-sectional views illustrating in order various steps of a pipe lining method according to the present invention.

Referring specifically to FIG. 2, in the pipe lining method of this embodiment, the cutting protection member 1 previously illustrated in FIG. 1 is first fitted into a branch pipe opening (a portion of a branch pipe open to a main pipe) from a main pipe 10 and fixed with an arbitrary means (for example, an appropriate adhesive). Specifically, the cutting protection member 1 is attached along the periphery of the branch pipe opening of the main pipe 10 such that the flange portion 1a is closely contacted to the inner wall of the main pipe 10, and the protector portion 1b is fitted into the branch pipe 11.

Figure 3:
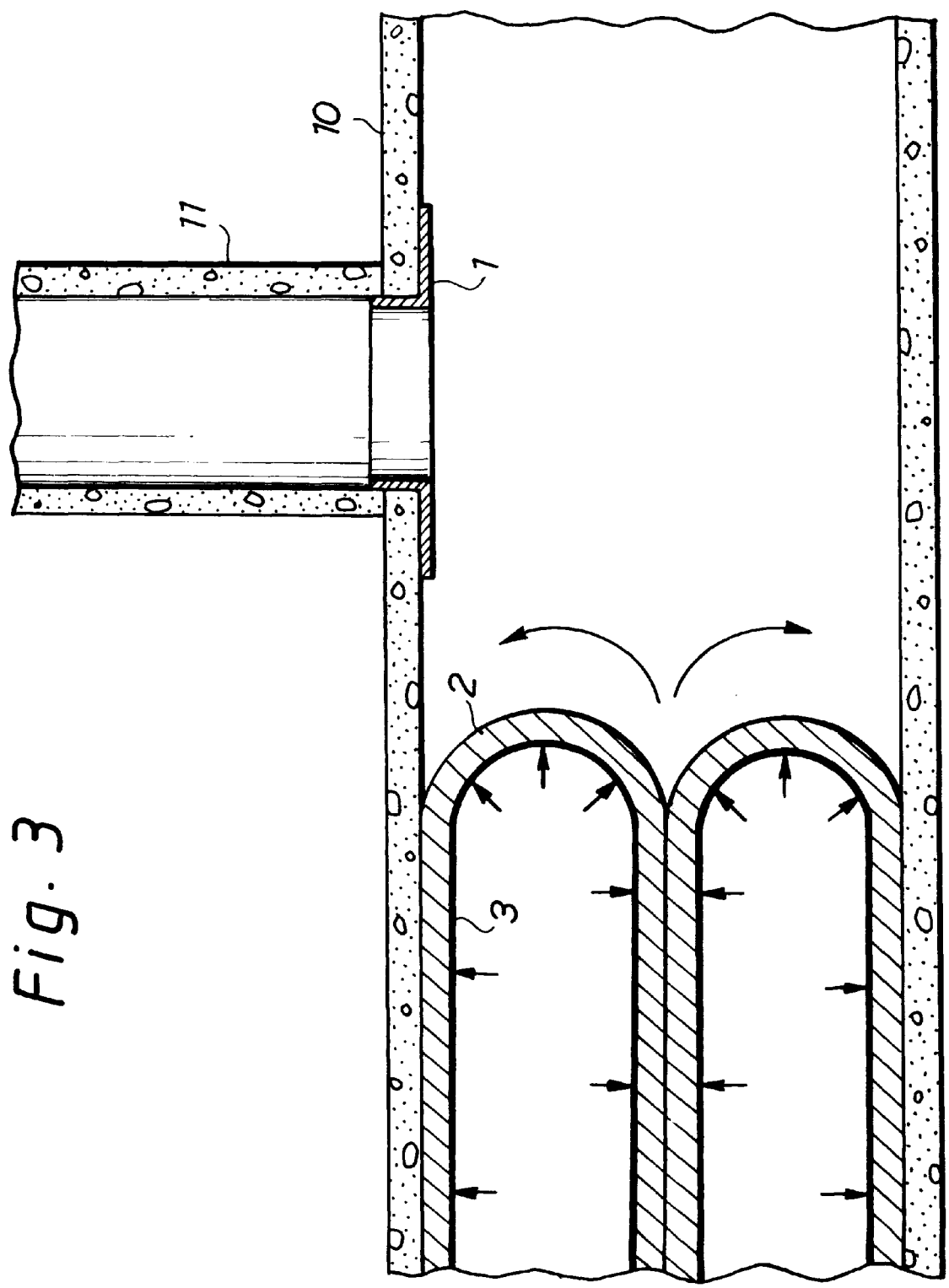

Once the cutting protection member 1 is attached along the periphery of the branch pipe opening of the main pipe 10, the main pipe is lined using a main pipe liner bag 2, as illustrated in FIG. 3.

More specifically, the main pipe liner bag 2 is everted and inserted into the main pipe 10 with a fluid pressure such as an air pressure or the like. The main pipe liner bag 2 comprises a tubular resin-absorbent material having its outer peripheral surface covered with a highly air-tight plastic film 3, and an unhardened liquid thermosetting resin impregnated in the tubular resin-absorbent material. The tubular resin-absorbent material is made of unwoven fabric such as polyester, polypropylene, acrylic fabric, or the like, and the unhardened liquid hardenable resin impregnated in the tubular resin-absorbent material may be a thermosetting resin such as unsaturated polyester resin, epoxy resin, vinyl ester resin, or the like. The plastic film 3 may be molded into a seamless tubular shape by an inflation method, and a material suitable for the plastic film 3 may be selected from polyurethane, polyethylene, nylon, ethylene vinyl alcohol, admer, ionomer, vinyl chloride, and so on. The plastic film 3 is applied over the entire outer surface of the tubular resin-absorbent material by thermal welding, bonding or coating.

Figure 4:
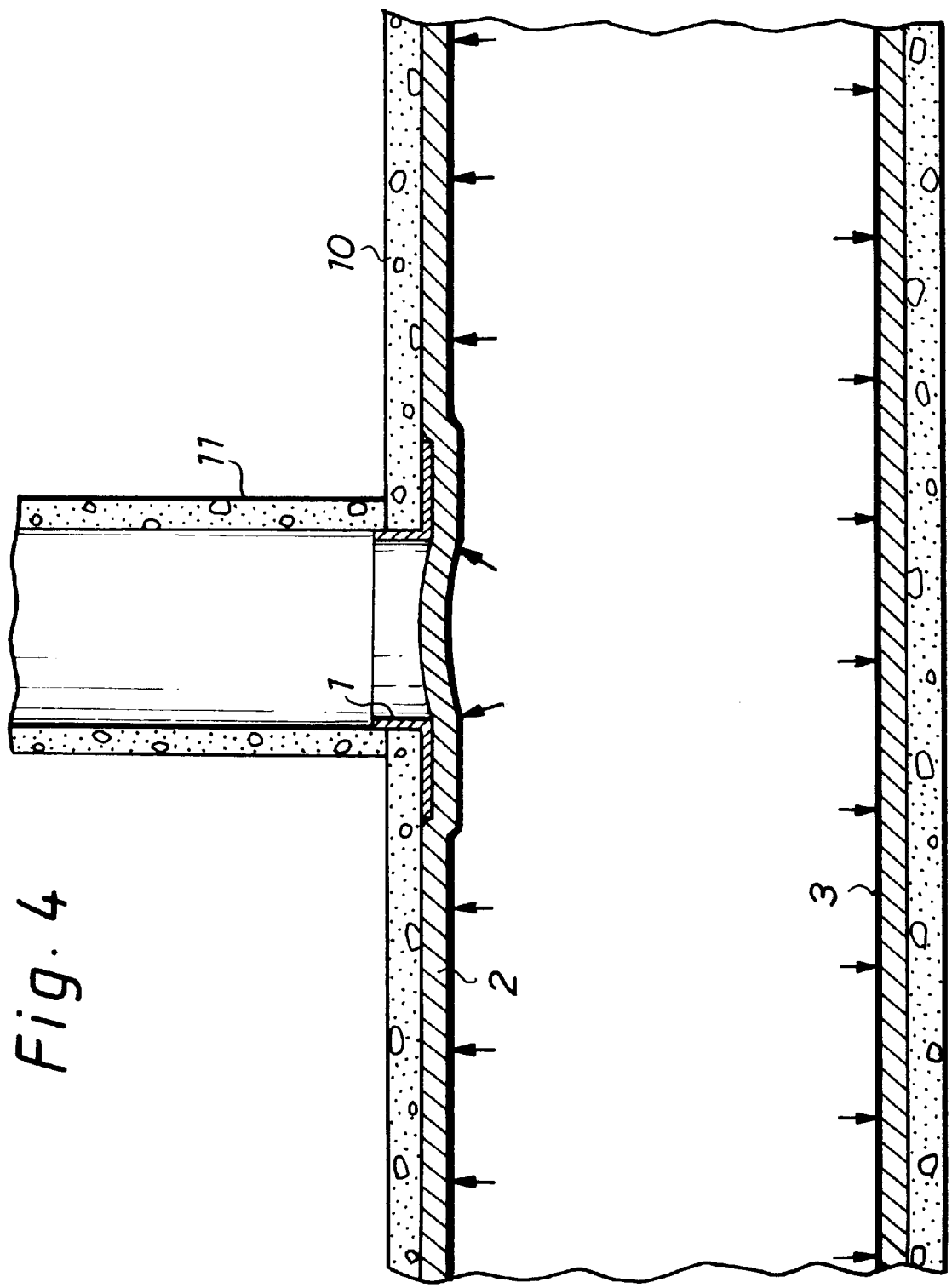

Next, as illustrated in FIG. 4, when the main pipe liner bag 2 has been inserted into the main pipe 10 over the entire length of the main pipe 10, a fluid pressure is applied into the main pipe liner bag 2 to press the main pipe liner bag 2 onto the inner wall surface of the main pipe 10. With the main pipe liner bag 2 continuously pressed onto the inner wall surface of the main pipe 10, the main pipe liner bag 2 is heated by an arbitrary heating means to harden the thermosetting resin impregnated therein. This results in the hardened main pipe liner bag 2 lined on the inner wall surface of the main pipe 10, thus repairing the main pipe 10.

Figure 5:
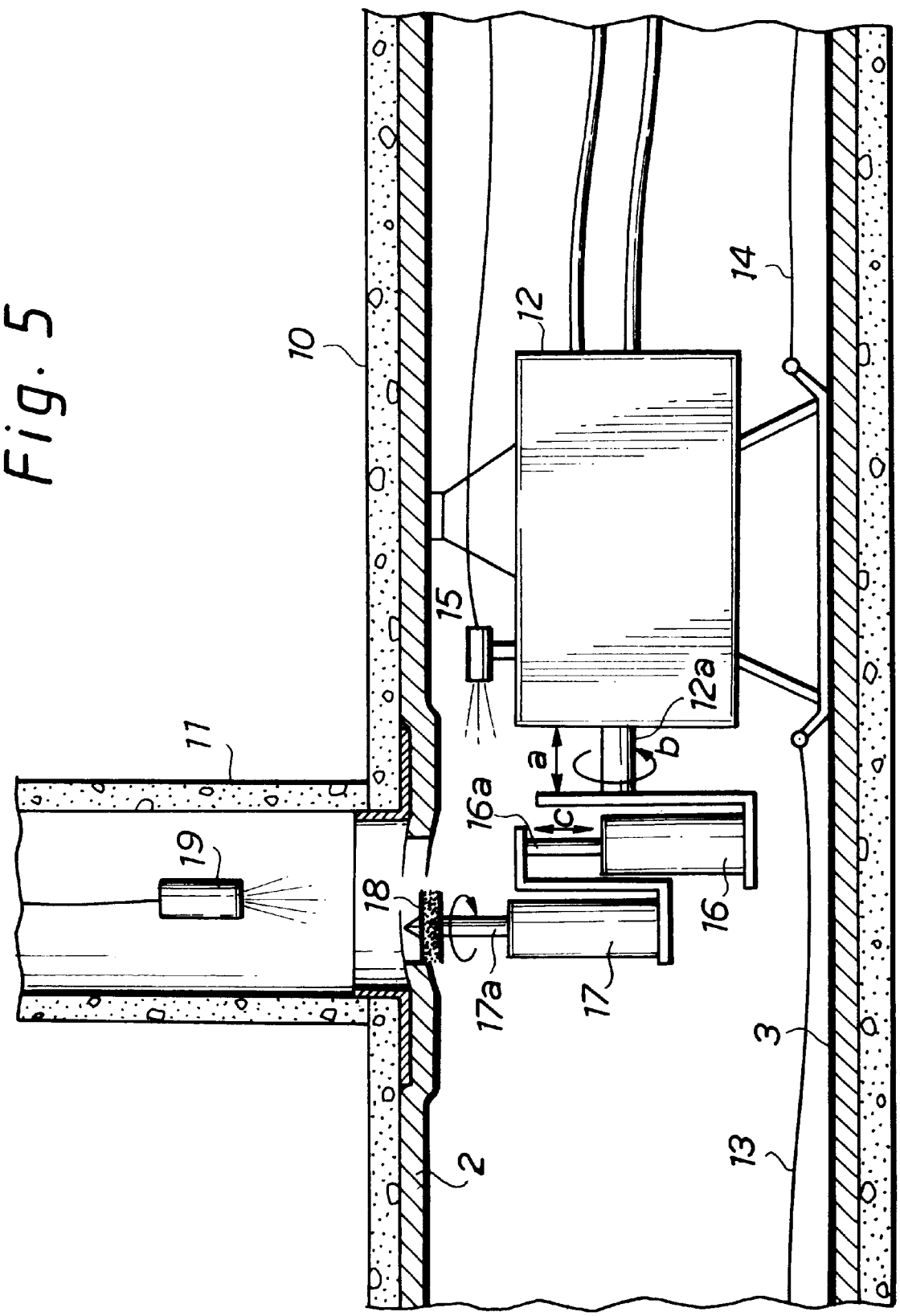

When inner wall surface of the main pipe liner bag 2 is lined with the main pipe liner bag 2, a branch pipe opening of the main pipe 10 is covered with the main pipe liner bag 2, so that a portion of the main pipe liner bag 2 covering the branch pipe opening must be removed or cut away to communicate the branch pipe 11 with the main pipe 10, as illustrated in FIG. 5.

Figure 7:
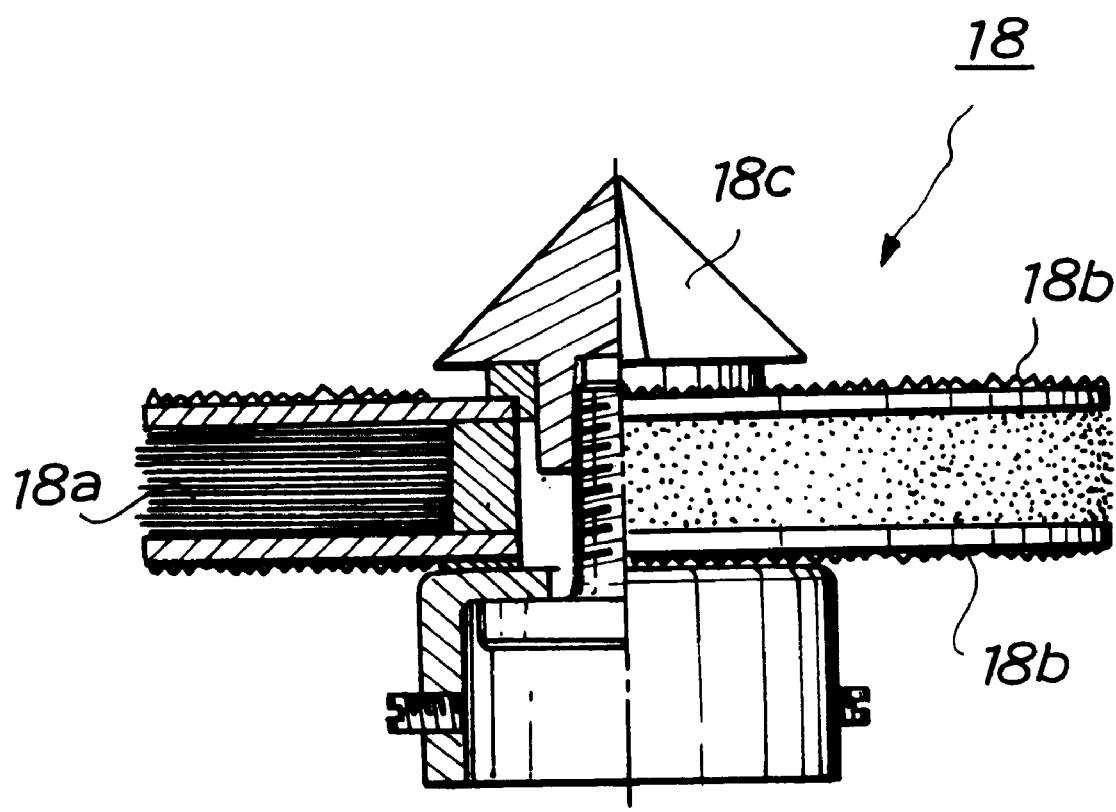
FIG. 7 is a front view of a cutter used in the pipe lining method according to the present invention, with a left-hand portion showing a cross-sectional view of the cutter.

More specifically, a cutting robot 12 is introduced into the main pipe 10 for a cutting operation for cutting away the covering portion of the main pipe liner bag 2. The cutting robot 12 is hydraulically driven to advance and retract its head 12a in the directions indicated by arrows a, and to rotate the head 12a in the directions indicated by arrows b. Pull ropes 13, 14 are connected to the robot 12, and a TV camera 15 is installed on the top of the robot 12. The head 12a of the cutting robot 12 is provided with a hydraulic cylinder 16, and a hydraulic motor 17 is supported by a rod 16a of the hydraulic cylinder 16 vertically movable in the directions indicated by arrows c in FIG. 5. Then, a cutter 18 having an outer diameter smaller than the inner diameter of the cutting protection member 1 is attached to an output shaft 17a of the hydraulic motor 17. As illustrated in the half cross-sectional view of FIG. 7, the cutter 18 includes a wire brush 18a sandwiched between upper and lower discoidal sanding disks 18b, and a rimer 18c on the top.

While monitoring situations within the main pipe 10 and the branch pipe 11 with the TV camera 15 installed on the cutting robot 12 and another TV camera 19 introduced in the branch pipe 11, the pull rope 13 or 14 is pulled to move the cutting robot along the main pipe 10 in an appropriate direction in order to place the cutter 18 at a predetermined position. Subsequently, as the hydraulic motor 17 and the cutter 18 are moved upward while the hydraulic motor 17 is being driven to rotate the cutter 18, a portion of the main pipe liner bag 2 covering the branch pipe opening (a portion surrounded by the cutting protection member 1) is cut by the cutter 18. In this event, since the cutting protection member 1 functions as a guide for the cutter 18 as well as functions as a protection member for protecting the inner wall of the branch pipe 11, the main pipe liner bag 2 can be precisely cut away along the branch pipe opening using the cutter 18, thereby making it possible to prevent damages to the inner wall periphery of the branch pipe 11 and the cutter 18 itself.

In addition, since the wire brush 18a of the cutter 18 can cut the main pipe liner bag 2 made of a hardened resin but cannot cut the cutting protection member 1 made of a metal, the cutting protection member 1 will never be cut by the cutter 18, whereby the inner wall of the branch pipe 11 and the cutter are more reliably protected by the cutting protection member 1 from damages.

In this embodiment, since the situation within the branch pipe 11 is monitored on the ground through the TV camera 19 introduced into the branch pipe 11, it is possible to prevent the occurrence of inconvenience such as the wire brush 18a of the cutter 18 being excessively pressed onto the cutting protection member 1 to be bent.

Figure 6:
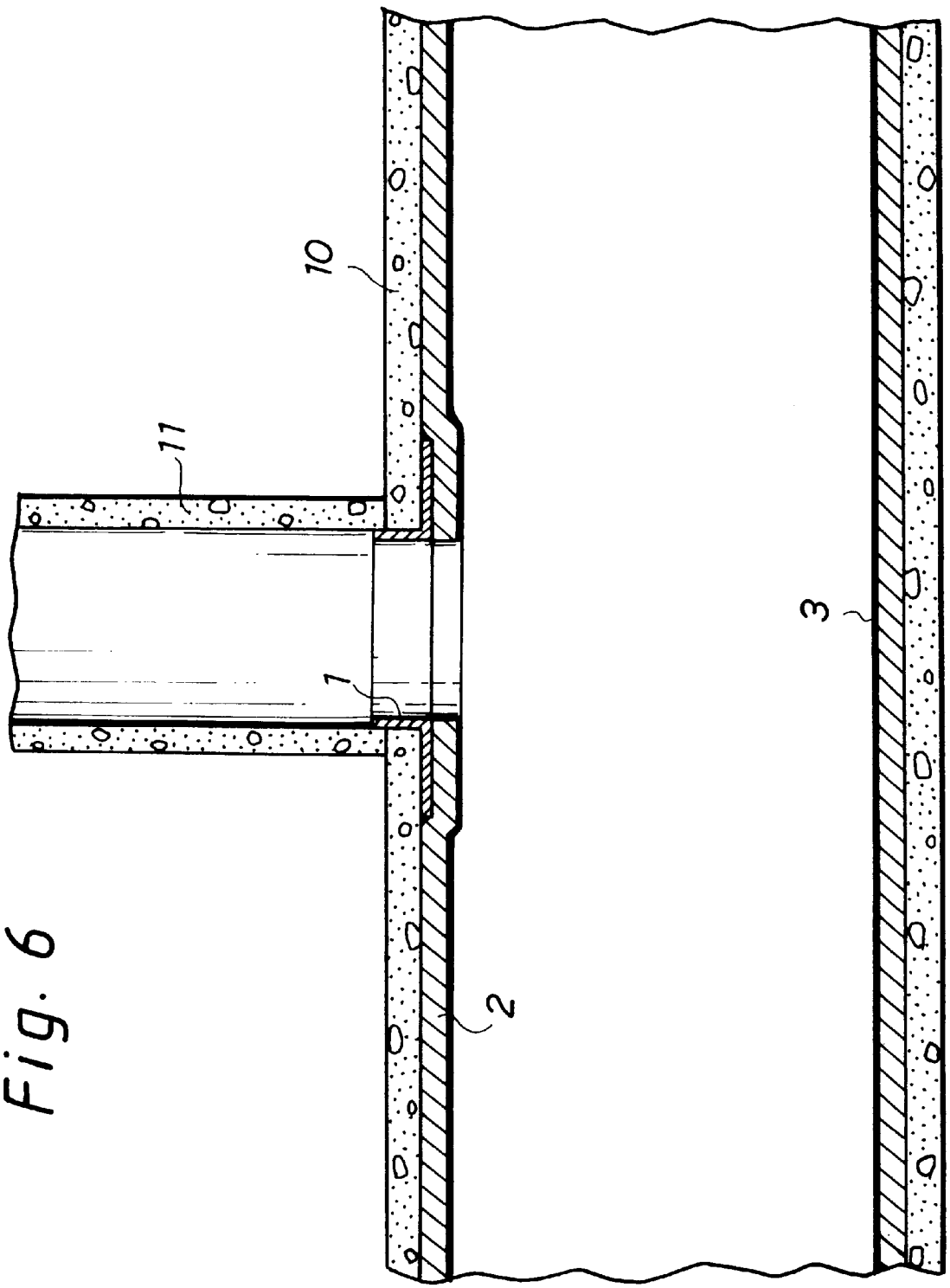

Once the portion of the main pipe liner bag 2 covering the branch pipe opening is completely cut away by the cutter 18 as mentioned above, the branch pipe 11 is open to the main pipe 10 so that they are in communication with each other, as illustrated in FIG. 6.

As will be apparent from the foregoing description, the protection member is attached along the periphery of a branch pipe opening of a main pipe before the main pipe is lined using a main pipe liner bag, and subsequently the main pipe is lined using the main pipe liner bag, so that the protection member functions as a guide for the remover such as cutter when removing a portion of the main pipe liner bag covering the branch pipe opening as well as functions as a protection member for protecting the inner wall periphery of the branch pipe, thereby making it possible to precisely remove the main pipe liner bag along the branch pipe opening and to prevent the inner wall periphery of the branch pipe opening from damages.

Further, since the situation within a branch pipe is monitored on the ground, it is possible to prevent the occurrence of inconvenience such as the wire brush of the cutter being excessively pressed onto the protection member to be bent.

While the present invention has been described in connection with its preferred embodiments, it is to be understood that various modifications will occur to those skilled in the art without departing from the spirit of the invention. The scope of the present invention is therefore to be determined solely by the appended claims.

What is claimed is:

1. A pipe lining method for a main pipe having a branch pipe extending from said main pipe, said branch pipe being not lined, said method comprising the steps of:

attaching a protection member along a periphery of an opening of said branch pipe toward said main pipe;

lining said main pipe using a main pipe liner bag, said main pipe liner bag comprising a tubular resin-absorbent material and an unhardened liquid hardenable resin impregnated into said tubular resin-absorbent material; and removing a portion of said main pipe liner bag covering said opening of the branch pipe.

2. A pipe lining method according to claim 1, wherein said portion of the main pipe liner bag is removed by cutting with a cutter.

3. A pipe lining method according to claim 2, wherein a robot having said cutter is introduced into said main pipe.

4. A pipe lining method according to claim 1, wherein said protection member includes a flange portion contacting to said main pipe and a protection portion fitting into said branch pipe.

5. A pipe lining method according to claim 1, wherein said protection member is made of metal.

6. A pipe lining method according to claim 2, wherein said cutter includes at least a wire brush.

7. A pipe lining method according to claim 1, wherein said step of removing includes monitoring a situation within the branch pipe.

8. A pipe lining method according to claim 7, wherein said monitoring is made with a TV camera introduced into the branch pipe.

9. A pipe lining method according to claim 1, wherein said protection member is directly attached to the periphery of said opening of the branch pipe toward said main pipe.

10. A pipe line comprising a main pipe, at least one branch pipe extending from said main pipe, a protection member attached along a periphery of an opening of said branch pipe toward said main pipe, said protection member including a flange portion contacting to said main pipe, both of said main pipe and said flange portion of the protection member being lined with a main pipe liner bag, and said main pipe liner bag being partially removed at said opening of the branch pipe.

11. A pipe line according to claim 10, wherein said main pipe liner bag includes a tubular resin-absorbent material impregnated with a hardenable resin.

12. A pipe line according to claim 10, wherein said protection member further includes a protection portion fitting into said branch pipe.

* * * * *